Figure 1:
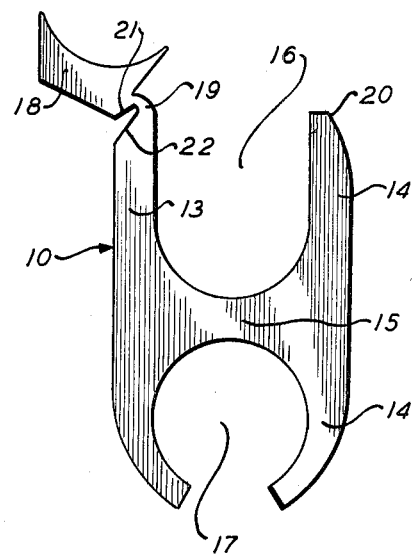

Feb. 15, 1966  E. L. ELDRIDGE, JR  3,235,654
COMPRESSION TAP

Filed March 19, 1964  2 Sheets-Sheet 1

INVENTOR.
E. L. ELDRIDGE, Jr.
BY
ATTORNEY

Feb. 15, 1966　　　E. L. ELDRIDGE, JR　　　3,235,654
COMPRESSION TAP

Filed March 19, 1964　　　2 Sheets-Sheet 2

INVENTOR.
E. L. ELDRIDGE, Jr.
BY
ATTORNEY

United States Patent Office 3,235,654
Patented Feb. 15, 1966

3,235,654
COMPRESSION TAP
Edward L. Eldridge, Jr., Warren Township, N.J., assignor to The Thomas & Betts Co., Elizabeth, N.J., a corporation of New Jersey
Filed Mar. 19, 1964, Ser. No. 353,300
3 Claims. (Cl. 174—94)

This invention relates to a compression tap fitting for connection of wires, cables or the like for example, for connection of service and power line, said tap being so formed as to be rugged, reliable and efficient in use.

Pursuant to the invention, the compression tap is formed with a tab extended from the side wall of the body and of equal width which serves the dual function of a wire retainer and filler. The tap is adapted for use with a great range of wire sizes, reducing the number of fitting sizes needed to accommodate a given range of wire sizes and the tap is so constructed that facile and positive locking of the cable in the fitting is achieved.

The drawings, illustrating procedures and devices useful in carrying out the invention, and the description below, are examplary only of the invention, which shall be deemed to cover all other devices and procedures coming within the scope and purview of the appended claims.

Figure 2:
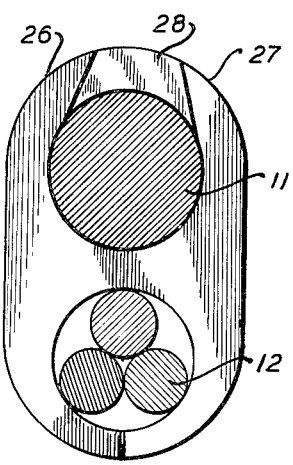
Figure 3:
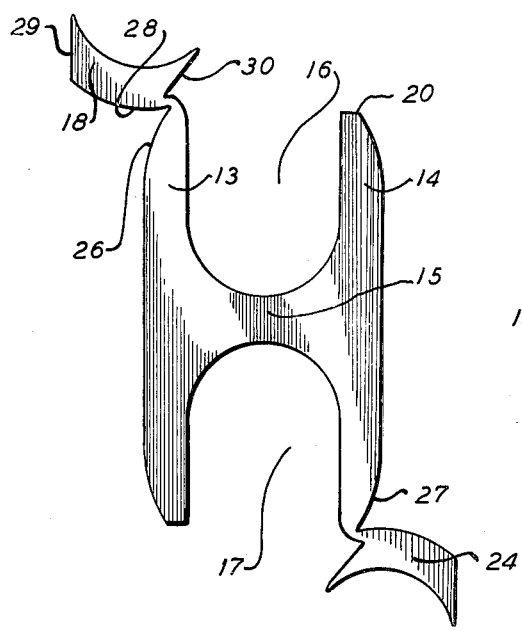
Figure 4:
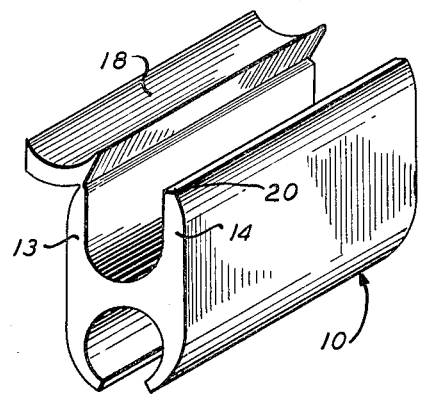
Figure 5:
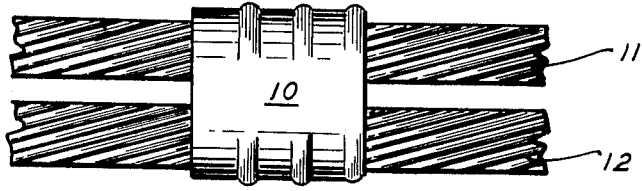
Figure 6:
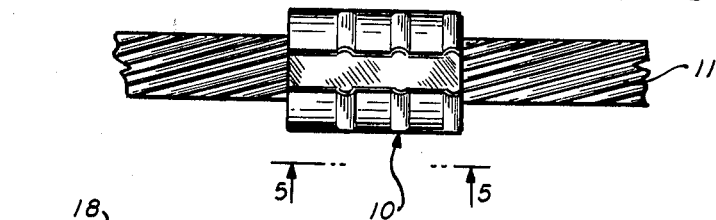
Figure 7:
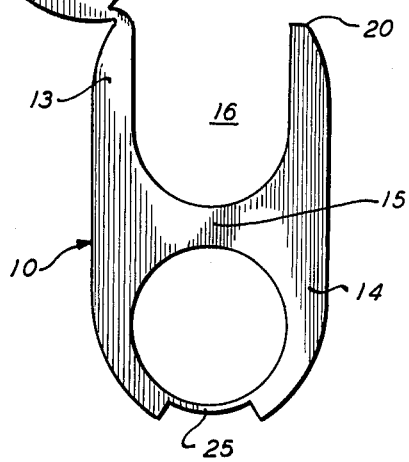
Figure 8:
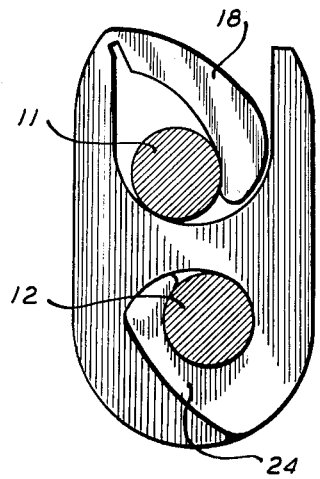

In the drawings, wherein similar reference characters indicate like parts:

FIG. 1 is an end elevational view of a compression tap embodying the invention shown in open position, FIG. 2 is a similar view, showing the compression tap holding a pair of wires or cables, FIG. 3 is an end elevational view, similar to FIG. 1 but showing a second tab formed on the body member, FIG. 4 is a perspective view of a body member embodying the invention, FIG. 5 is a side elevational view showing a pair of wires or cables in a compression tap of the invention, taken at line 5—5 of FIG. 6, FIG. 6 is a top plan view thereof, taken at line 6—6 of FIG. 5, FIG. 7 is an end elevational view of the compression tap formed with a web closing an end of the body member, and FIG. 8 shows the tap used as a filler and retainer with small side sized wires.

The compression tap of this invention is especially adapted for use in the connection of wires or cables, for example, service lines and power lines 11, 12. Such connections are customarily made at elevated positions; in addition the service man has the problem of positioning the service and power lines in the fitting and positioning the assembly in the compression tool. The present invention is designed to facilitate the work of the serviceman and enable him to simply and accurately and in a rugged and durable fashion connect the lines for insertion into the compression tool. The body member 10 of the invention is formed of compressible material, of H shaped cross sectional outline (FIG. 1) defined by a pair of parallel side walls of 13 and 14 and a web portion 15 connecting the side walls 13, 14 intermediate their length and thus defining, with the side walls, outwardly opening recesses 16, 17 for reception of wires or cables such as 11, 12. Pursuant to the invention, one of the side walls, for example, side wall 13 (FIG. 1) is extended beyond the other, to define a tab 18 of substantially the thickness of the side walls 13, 14. The tab 18 is connected to the side wall from which it extends at a weakened fold portion 19 substantially aligned with the end 20 of the other side wall. Said fold portion 19 may be formed (FIG. 1) by compression or inward tapering or curvature of the wall 13 and tab 18 adjacent the point of connection 19. Thus the tab 18 may be of the thickness of the side wall 13 except at the weakened point 19, which facilitates readily folding the tab against the oppoosite side wall manually when desired as after position a wire or cable 11 in recess 16. If desired, a second tab 24 may (FIG. 3) be similarly formed at the oppoosite open end of the body member to be folded over the other wire or cable 12.

FIG. 4 is a perspective view of the body member, showing the tab 18 formed (as above noted) essentially of the thickness of the side wall 13; the device thus provides an essentially unitary, thick, rugged compression tap which will be sturdy and durable in use and versatile and well adapted for its intended purpose.

In the form shown in FIG. 7, side walls 13 and 14 are connected by a transversely extending web portion 25 at the end of the body opposite the tab 18, to facilitate holding the lower wire or cable (FIGS. 2 and 5), the other wire being secured to the body member 10.

FIG. 8 illustrates the use of the compression tap of the invention as a filler and retainer on small wire sizes. The invention is adapted for use with a variety of wire sizes.

The tab 18 is preferably formed of generally arcuate cross sectional outline. The side walls 13 or 14 may be rounded at the free ends as shown at 26, 27 (FIG. 2) and the tab formed arcuately as shown at 28 (FIG. 3) to conform to the so-rounded ends when the tab is folded (FIG. 2). The tab may be formed of concavo-convex cross sectional outline (FIG. 3) and with tapered ends 29, 30 (FIG. 3).

Having thus described by invention, what I claim as new and desire to secure by Letters Patent is:

1. A compression connector comprising a body of compressible material formed in generally H shaped cross section, said body including a pair of parellel side walls and an intermediate interconnecting web portion defining at least one outwardly opening recess, a recess closing tab on one of said side walls movable between normally open recess and closed recess defining positions extending beyond the other of said side walls, hinge means interconnecting said tab and said side wall from which it extends in substantially aligned relation with the end of the other side wall, said tab including a generally arcuate inner surface, a substantially arcuate outer surface and at least one angularly related side wall interconnecting said inner and outer surfaces, said tab being proportioned to extend substantially across the spacing between the side walls prior to compression and to conform to the spacing between the side walls after compression, whereby when said tab is folded from said normally open position to said closed position within the opposite side wall and compressed, to thus close said recess defined by said web and said side walls, said side walls and said tab being of substantially equal and uniform thickness throughout prior to compression.

2. The device defined by claim 1 wherein said body includes means defining a plurality of outwardly opening recesses and a recess closing tab on one of the side walls of each such recess.

3. A compression connector comprising a body of compressible material formed in generally H shaped cross section, said body including a pair of parallel side walls and an intermediate interconnecting web portion defining at least one outwardly opening recess, a recess closing tab on one of said side walls movable between normally open recess and closed recess defining positions extending beyond the other of said side walls, hinge means interconnecting said tab and said side wall from which it extends in substantially aligned relation with the end of the other side wall, said tab including a generally arcuate inner surface, a substantially arcuate outer surface and at least one angularly related side wall interconnecting said inner and outer surfaces, said tab being proportioned to extend substantially across the spacing between the side walls prior to compression and to conform to the spacing between the side walls after compression, whereby when said tab is folded from said normally open position to said closed position against the opposite side wall and compressed, to thus close said recess defined by said web and said side walls, said side walls and said tab being of substantially equal and uniform thickness throughout prior to compression.

References Cited by the Examiner
UNITED STATES PATENTS
3,156,764  11/1964  Toedtman _____ 174—94

JOHN F. BURNS, Primary Examiner.

DARRELL L. CLAY, Examiner.